(12) United States Patent
Sakakura et al.

(10) Patent No.: US 11,145,423 B2
(45) Date of Patent: Oct. 12, 2021

(54) PRESSURE VESSEL

(71) Applicant: IHI CORPORATION, Tokyo (JP)

(72) Inventors: Shigeki Sakakura, Tokyo (JP); Yu Murakami, Tokyo (JP); Nobuyuki Honma, Tokyo (JP); Toshiyuki Sakata, Tokyo (JP); Kohei Tsurugaya, Tokyo (JP); Daisuke Tsunoda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 44 days.

(21) Appl. No.: 16/405,255

(22) Filed: May 7, 2019

(65) Prior Publication Data

US 2019/0259504 A1    Aug. 22, 2019

Related U.S. Application Data

(63) Continuation of application No. PCT/JP2017/041600, filed on Nov. 20, 2017.

(30) Foreign Application Priority Data

Nov. 25, 2016  (JP) .............................. JP2016-228895

(51) Int. Cl.
*F28F 9/06* (2006.01)
*G21C 1/32* (2006.01)
(Continued)

(52) U.S. Cl.
CPC ................ *G21C 1/32* (2013.01); *F16J 12/00* (2013.01); *F28D 1/06* (2013.01); *F28F 1/00* (2013.01);
(Continued)

(58) Field of Classification Search
CPC .. G21C 13/0285; G21C 13/036; G21C 15/24; F16J 12/00; F28D 2021/0022
See application file for complete search history.

(56) References Cited

U.S. PATENT DOCUMENTS 3,109,552 A    11/1963  Miller
4,260,013 A     4/1981  Sumitomo
(Continued)

FOREIGN PATENT DOCUMENTS

CN    101678312 A    3/2010
CN    102997725 A    3/2013
(Continued)

OTHER PUBLICATIONS

European Patent Office, "Extended European Search Report", issued in European Patent Application No. 17 874 257.3 which is a counterpart to U.S. Appl. No. 16/405,255, dated May 19, 2020, 6 pages.
(Continued)

*Primary Examiner* — Lily C Garner

(57) ABSTRACT

A pressure vessel comprises a pressure vessel body having a rectangular cross-sectional shape and formed to extend in the direction of flow of fluids, and the pressure vessel body includes a first flow channel which is formed in the longitudinal direction of the pressure vessel body and through which a first fluid is caused to flow, a second flow channel which is formed in the longitudinal direction of the pressure vessel body and through which a second fluid is caused to flow, a first-fluid inlet-outlet port which is provided in one longitudinal end surface of the pressure vessel body and connects with the first flow channel and through which the first fluid is caused to flow in or out, a second-fluid inlet-outlet port which is provided in the other longitudinal end surface of the pressure vessel body and connects with the second flow channel and through which the second fluid is caused to flow in or out, an opening portion which is provided in the one longitudinal end surface of the pressure vessel body and connects with the second flow channel, and
(Continued)

a closing member which closes the opening portion in a demountable manner.

12 Claims, 5 Drawing Sheets

(51) Int. Cl.
| | |
|---|---|
| *F28F 9/12* | (2006.01) |
| *G21C 13/028* | (2006.01) |
| *G21C 13/036* | (2006.01) |
| *G21C 15/24* | (2006.01) |
| *F28D 1/06* | (2006.01) |
| *F28F 3/08* | (2006.01) |
| *F16J 12/00* | (2006.01) |
| *F28F 1/00* | (2006.01) |

(52) U.S. Cl.
CPC ............... *F28F 3/08* (2013.01); *F28F 9/12* (2013.01); *G21C 13/0285* (2013.01); *G21C 13/036* (2013.01); *G21C 15/24* (2013.01)

(56) References Cited

U.S. PATENT DOCUMENTS

| | | | |
|---|---|---|---|
| 9,047,996 B2 * | 6/2015 | Agace | ................ A61K 39/3955 |
| 2010/0143215 A1 | 6/2010 | Caze et al. | |
| 2010/0160705 A1 | 6/2010 | Kösters | |
| 2011/0194997 A1 | 8/2011 | Reading et al. | |
| 2012/0103578 A1 | 5/2012 | Taylor | |
| 2012/0210995 A1 | 8/2012 | West | |
| 2015/0064078 A1 | 3/2015 | Kosters | |
| 2015/0136366 A1 | 5/2015 | Fukui et al. | |
| 2015/0352517 A1 | 12/2015 | Tanabe et al. | |

FOREIGN PATENT DOCUMENTS

| | | | |
|---|---|---|---|
| CN | 203336988 U | 12/2013 | |
| CN | 104428622 A | 3/2015 | |
| CN | 105934646 A | 9/2016 | |
| GB | 2501413 A | 10/2013 | |
| JP | S56-149593 A | 11/1981 | |
| JP | S59-195396 U | 12/1984 | |
| JP | S60-091969 U | 6/1985 | |
| JP | H08-291997 A | 11/1996 | |
| JP | 2010-532244 A | 10/2010 | |
| JP | 2010-532707 A | 10/2010 | |
| JP | 2012-506311 A | 3/2012 | |
| JP | 2012-525562 A | 10/2012 | |
| JP | 2013-508150 A | 3/2013 | |
| JP | 5490265 B2 | 5/2014 | |
| JP | 2014-142111 A | 8/2014 | |
| JP | 2014-166603 A | 9/2014 | |
| JP | 2015-140960 A | 8/2015 | |
| JP | 2015140960 A * | 8/2015 | ........... B28B 11/006 |
| JP | 2017-140591 A | 8/2017 | |

OTHER PUBLICATIONS

The State Intellectual Property Office of People's Republic of China, "First Office Action", issued in Chinese Patent Application No. 201780070733.4, which is a counterpart to U.S. Appl. No. 16/405,255, dated Mar. 26, 2020, 7 pages.
China National Intellectual Property Administration, "Second Office Action", issued in Chinese Patent Application No. 201780070733.4, which is a CN counterpart to U.S. Appl. No. 16/405,255, dated Dec. 31, 2020, 7 pages.
European Patent Office, "Communication," issued in European Patent Application No. 17 874 257.3, which is an EP counterpart to U.S. Appl. No. 16/405,255, dated Dec. 23, 2020, 4 pages.
China National Intellectual Property Administration, "Third Office Action", issued in Chinese Patent Application No. 201780070733.4, which is a counterpart to U.S. Appl. No. 16/405,255, dated May 20, 2021, 7 pages.

* cited by examiner

Prior Art

PRESSURE VESSEL

CROSS REFERENCE TO RELATED APPLICATIONS

This application is a continuation application of International Application No. PCT/JP2017/041600, filed on Nov. 20, 2017, which claims priority to Japanese Patent Application No. 2016-228895, filed on Nov. 25, 2016, the entire contents of which are incorporated by references herein.

BACKGROUND

1. Field

The present disclosure relates to a pressure vessel.

2. Description of the Related Art

In pressure vessels such as reactors and heat exchangers, heat exchange is performed between a primary fluid and a secondary fluid for production of a reacted product, heating, cooling, and so on. A pressure vessel configured as a heat exchanger is described in Published Japanese Translation of PCT International Application No. 2012-525562 (Patent Literature 1.

SUMMARY

Meanwhile, FIG. 1 is a schematic view illustrating the configuration of a conventional pressure vessel 100. The conventional pressure vessel 100, which is a reactor, a heat exchanger, or the like, includes a shell part 102 provided with flow channels through which a first fluid A and a second fluid B are caused to flow, and lid members 104 and 106 provided on the opposite longitudinal sides of the shell part 102 so as to be openable and closable. The first fluid A flows in from a nozzle on the lid member 104, flows through the flow channel for the first fluid in the shell part 102, and is discharged from one header 108. The second fluid B flows in from a nozzle on the lid member 106, flows through the flow channel for the second fluid in the shell part 102, and is discharged from the other header 110. As a result, the first fluid A and the second fluid B exchange heat with each other in the shell part 102.

In one longitudinal end surface of the shell part 102 is provided a first-fluid port which connects with the flow channel for the first fluid A and through which the first fluid A is caused to flow in. In the other longitudinal end surface of the shell part 102 is provided a second-fluid port which connects with the flow channel for the second fluid B and through which the second fluid B is caused to flow in. Then, for inspection of the flow channel for the first fluid A and the flow channel for the second fluid B, replacement of in-channel components such as catalyst members and fins provided in the flow channels, and sc on, the lid members 104 and 106 each need to be provided with an opening and closing structure such as a flange. This sometimes increases the number of components of the pressure vessel 100 and increases the manufacturing cost of the pressure vessel 100.

In view of this, an object of the present disclosure is to provide a pressure vessel whose manufacturing cost can be made lower.

A pressure vessel includes a pressure vessel body having a rectangular cross-sectional shape and formed to extend in a direction of flow of fluids, and the pressure vessel body includes a first flow channel which is formed in a longitudinal direction of the pressure vessel body and through which a first fluid is caused to flow, a second flow channel which is formed in the longitudinal direction of the pressure vessel body and through which a second fluid is caused to flow, a first-fluid inlet-outlet port which is provided in one longitudinal end surface of the pressure vessel body and connects with the first flow channel and through which the first fluid is caused to flow in or out, a second-fluid inlet-outlet port which is provided in another longitudinal end surface of the pressure vessel body and connects with the second flow channel and through which the second fluid is caused to flow in or out, an opening portion which is provided in the one longitudinal end surface of the pressure vessel body and connects with the second flow channel, and a closing member which closes the opening portion in a demountable manner.

The pressure vessel according to the present disclosure may further comprise a lid member which is provided on one longitudinal end surface side of the pressure vessel body and is operable and closable.

The pressure vessel according to the present disclosure may be such that the opening portion includes a positioning member which positions the closing member.

The pressure vessel according to the present disclosure may be such that the closing member is fixedly mounted in a demountable manner.

The pressure vessel according to the present disclosure may be such that the closing member is fixedly mounted in a demountable manner with an inorganic adhesive.

The pressure vessel according to the present disclosure may be such that the closing member is made of a same material as the pressure vessel body.

The pressure vessel according to the present disclosure may be such that the closing member is made of a material that exhibits greater thermal expansion than a material of the pressure vessel body.

The pressure vessel according to the present disclosure may be such that an in-channel component is provided in the second flow channel.

In the above configuration, it suffices that the one longitudinal end surface side of the pressure vessel body be configured to be openable and closable. Thus, the number of components of the pressure vessel can be reduced. Accordingly, the manufacturing cost of the pressure vessel can be lower.

DESCRIPTION OF EMBODIMENTS

Figure 1:
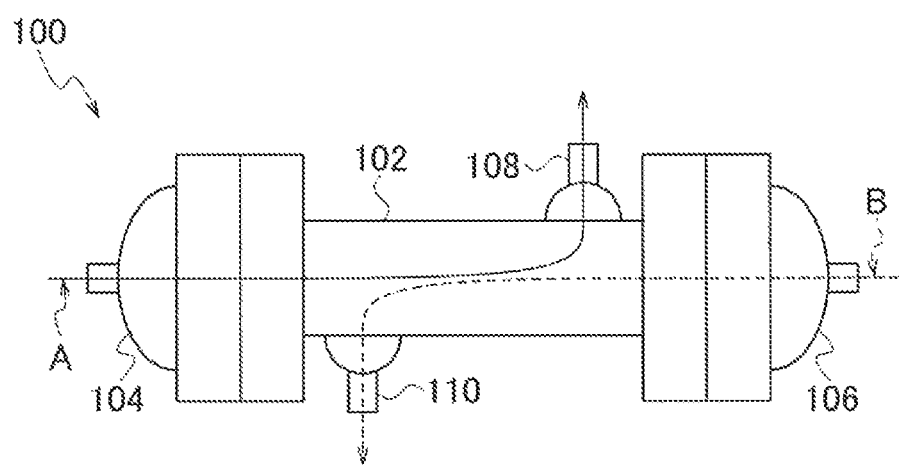
FIG. 1 is a schematic view illustrating the configuration of a conventional pressure vessel.
Figure 2:
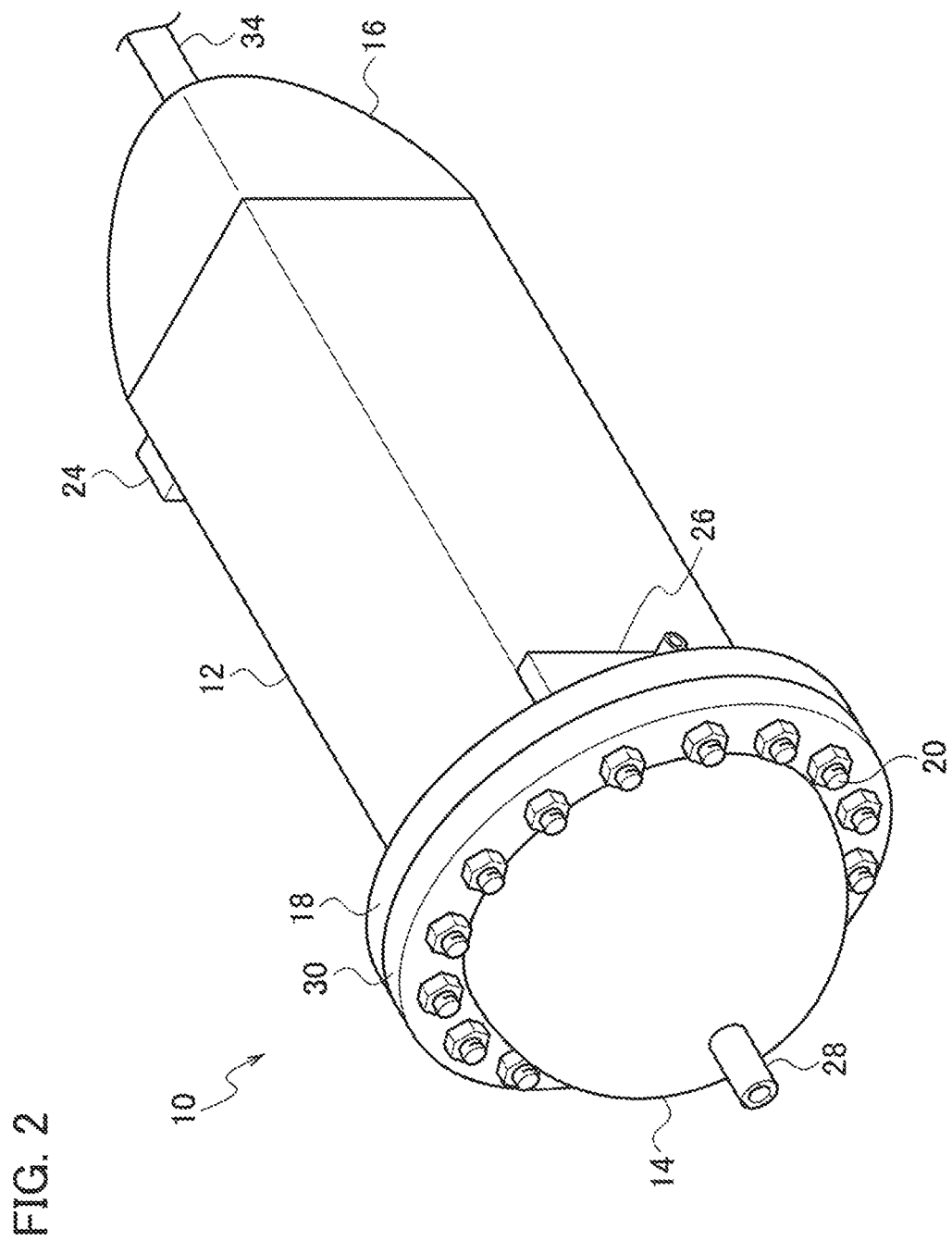
FIG. 2 is a schematic view illustrating the configuration of a pressure vessel in an embodiment of the present disclosure.
Figure 3:
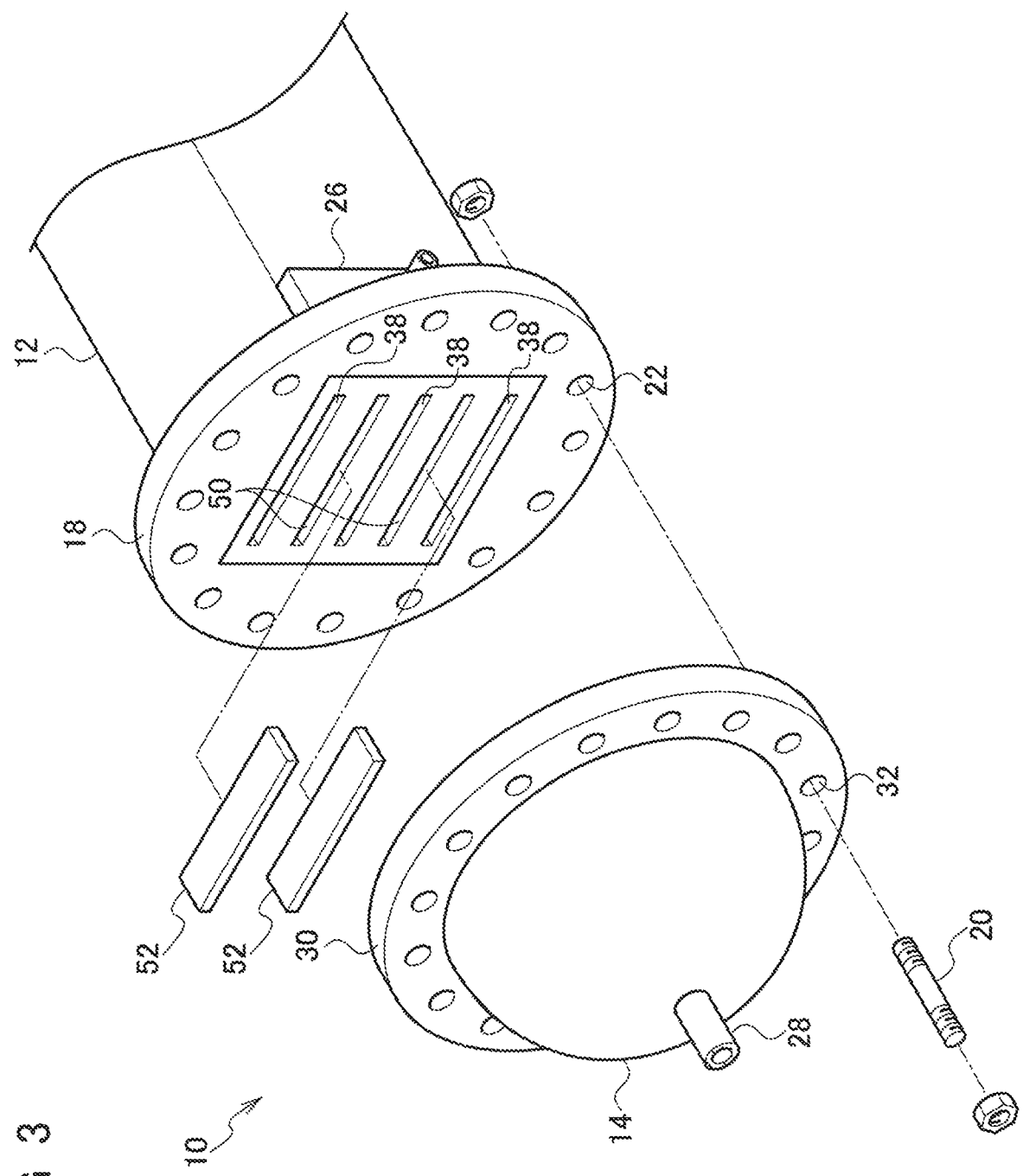
FIG. 3 is a detailed view illustrating the configuration of the pressure vessel in the embodiment of the present disclosure.

An embodiment of the present disclosure will be described below in detail by using drawings. FIG. 2 is a schematic view illustrating the configuration of a pressure vessel 10. FIG. 3 is a detailed view illustrating the configuration of the pressure vessel 10. The pressure vessel 10 is configured as a reactor, a heat exchanger, or the like, for example.

The pressure vessel 10 includes a pressure vessel body 12 having a rectangular cross-sectional shape and formed to extend in the direction of flow of fluids. The pressure vessel 10 includes two lid members 14 and 16 provided on the opposite longitudinal sides of the pressure vessel body 12.

A body flange 18 is provided on one longitudinal end surface side of the pressure vessel body 12. The body flange 18 is formed in a circular shape or the like. In the periphery of the body flange 18, the body flange 18 has fastening holes 22 for fastening it with fastening members such as bolts 20. The body flange 18 is joined to the pressure vessel body 12 by welding or the like. Also, an inlet-outlet header 24 which a first fluid is caused to flow into or out of is provided on the other longitudinal end surface side of the pressure vessel body 12. An inlet-outlet header 26 which a second fluid is caused to flow into or out of is provided on the one longitudinal end surface side of the pressure vessel body 12.

One of the lid members, namely, the lid member 14 is provided on the one longitudinal end surface side of the pressure vessel body 12. The lid member 14 is formed in dome shape or the like. The lid member 14 is provided with a nozzle 28 through which the first fluid is caused to flow in or out. The lid member 14 is provided with a lid flange 30. The lid flange 30 is formed in a circular shape or the like. In the periphery of the lid flange 30, the lid flange 30 has fastening holes 32 for fastening it with fastening members such as the bolts 20. The lid flange 30 is joined to the lid member 14 by welding or the like. The lid member 14 is provided so as to be openable and closable by fastening the body flange 18 and the lid flange 30 with fastening members such as the bolts 20. With this opening and closing structure, inspection, maintenance, and so on of the pressure vessel 10 can be performed in an opened state. This opening and closing structure may be provided only on the one longitudinal end surface side of the pressure vessel body 12.

The lid member 16 is provided on the other longitudinal end surface side of the pressure vessel body 12 and is formed in an unopenable state. The lid member 16 is joined to the pressure vessel body 12 by welding or the like. The lid member 16 has a nozzle 34 through which a second fluid flows in or out. Note that the pressure vessel body 12, the lid members 14 and 16, the body flange 18, and the lid flange 30 are made of stainless steel, a Ni alloy (nickel), low-alloy steel, carbon steel, or the like, for example.

In one example, in the pressure vessel 10, the first fluid having flowed in from the nozzle 28 of the lid member 14 is discharged from the inlet-outlet header 24 of the pressure vessel body 12. On the other hand, the second fluid having flowed in from the nozzle 34 of the lid of member 16 is discharged from the inlet-outlet header 26. As a result, the pressure vessel 10 allows heat exchange between the first fluid and the second fluid in the pressure vessel body 12.

Figure 4:
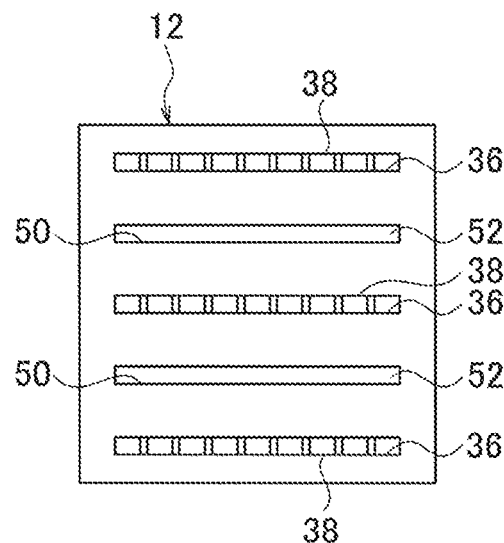
FIG. 4 is a schematic front view illustrating one longitudinal end surface side of a pressure vessel body in the embodiment of the present disclosure.
Figure 5:
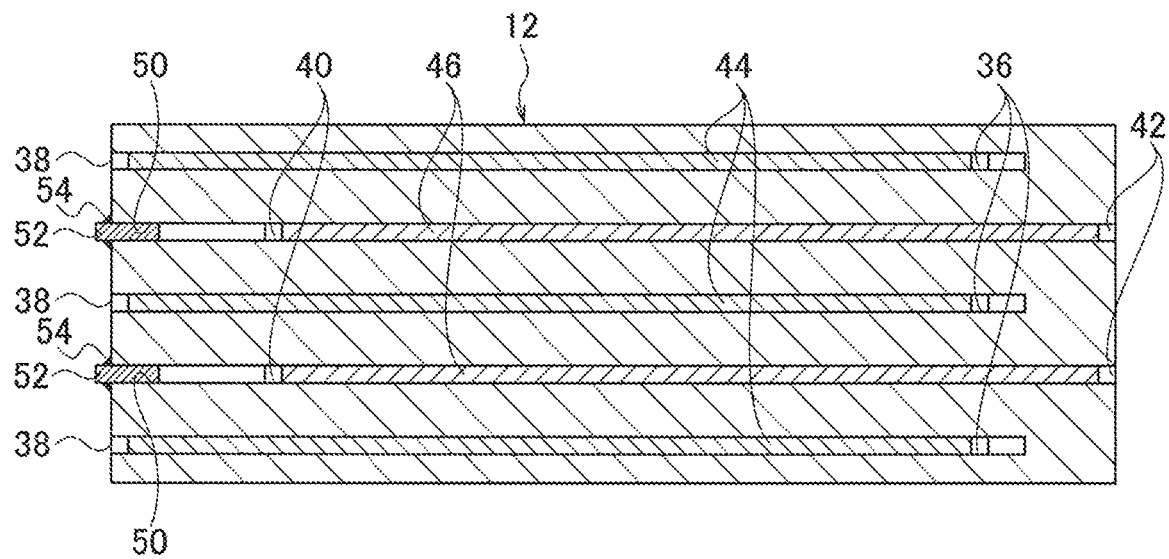
FIG. 5 is a schematic cross-sectional view illustrating a longitudinal cross section of the pressure vessel body in the embodiment of the present disclosure.

Next, the pressure vessel body 12 will be described in detail. FIG. 4 is a schematic front view illustrating the one longitudinal end surface side of the pressure vessel body 12. FIG. 5 is a schematic cross-sectional view illustrating a longitudinal cross section of the pressure vessel body 12. The pressure vessel body 12 has a rectangular cross-sectional shape and is formed to extend in the direction of flow of the fluids. The pressure vessel body 12 is formed in a cuboidal shape, for example.

The pressure vessel body 12 has a first flow channel 36 which is formed in the longitudinal direction of the pressure vessel body 12 and through which the first fluid is caused to flow. The first flow channel 36 may be formed along the longitudinal direction of the pressure vessel body 12. The first flow channel 36 may be provided as a single flow channel or provided as a plurality of flow channels. The first flow channel 36 may be formed in a straight shape or formed in a meandering shape.

The pressure vessel body 12 has a first-fluid inlet-outlet port 38 which is provided in the one longitudinal end surface of the pressure vessel body 12 and connects with the first flow channel 36 and through which the first fluid is caused to flow in or out. It suffices that at least one first-fluid inlet-outlet port 38 be provided, but a plurality of first-fluid inlet-outlet ports 38 may be provided. As an example, three first-fluid inlet-outlet ports 38 are provided in the one longitudinal end surface of the pressure vessel body 12, as illustrated in FIGS. 3 to 5.

In the case where the first fluid is caused to flow in from the nozzle 28 of the lid member 14, the first fluid having flowed in from the nozzle 28 then flows into the pressure vessel body 12 through its first-fluid inlet-outlet ports 38, flows through the first flow channels 36, and is discharged from the inlet-outlet header 24 of the pressure vessel body 12. On the other hand, in the case where the first fluid is caused to flow in from the inlet-outlet header 24 of the pressure vessel body 12, the first fluid having flowed in from the inlet-outlet header 24 flows through the first flow channels 36 and out from the first-fluid inlet-outlet ports 38 of the pressure vessel body 12, and is discharged from the nozzle 28 of the lid member 14.

The pressure vessel body 12 has a second flow channel 40 which is formed in the longitudinal direction of the pressure vessel body 12 and through which the second fluid is caused to flow. The second flow channel 40 may be formed along the longitudinal direction of the pressure vessel body 12. The second flow channel 40 is formed separate from each first flow channel 36 so that the first fluid and the second fluid will not mix with each other. The second flow channel 40 may be provided as a single flow channel or provided as a plurality of flow channels. The second flow channel 40 may be formed in a straight shape or formed in a meandering shape.

In the other longitudinal end surface of the pressure vessel body 12, the pressure vessel body 12 has a second-fluid inlet-outlet port 42 through which the second fluid is caused to flow in or out. The second-fluid inlet-outlet port 42 is formed to connect with the second flow channel 40. It suffices that at least one second-fluid inlet-outlet port 42 be provided, but a plurality of second-fluid inlet-outlet ports 42 may be provided. As an example, two second-fluid inlet-outlet ports 42 are provided in the other longitudinal end surface of the pressure vessel body 12, as illustrated in FIG. 5.

In the case where the second fluid is caused to flow in from the nozzle 34 of the lid member 16, the second fluid having flowed in from the nozzle 34 then flows into the pressure vessel body 12 through its second-fluid inlet-outlet ports 42, flows through the second flow channels 40, and is discharged from the inlet-outlet header 26 of the pressure vessel body 12. On the other hand, in the case where the second fluid is caused to flow in from the inlet-outlet header 26 of the pressure vessel body 12, the second fluid having flowed in from the inlet-outlet header 26 flows through the second flow channels 40 and out from the second-fluid inlet-outlet ports 42 of the pressure vessel body 12, and is discharged from the nozzle 34 of the lid member 16.

In-channel components 44 and 46 such as catalyst members and fins may be inserted in the first flow channels 36 and the second flow channels 40. The first fluid and the second fluid may be caused to flow in the same direction (so-called co-current configuration) or in the opposite directions (so-called countercurrent configuration). As the first fluid and the second fluid, reactive fluids of organic compounds or the like, high-temperature gases such as combustion gases, water, coolants, and so on are usable, for example.

In the case where the pressure vessel 10 is a reactor, a reactive fluid is used as the first fluid and a heating medium is used as the second fluid, for example. The first fluid is heated or cooled via heat exchange between the first fluid and the second fluid. As a result, the first fluid, which is a reactive fluid, is reacted and a product can be produced.

The pressure vessel body 12 has opening portions 50 provided in the one longitudinal end surface of the pressure vessel body 12 and connecting with the second flow channels 40. The pressure vessel body 12 has closing members 52 closing the opening portions 50 in a demountable manner.

The opening portions 50 are closed by the closing members 52 in a demountable manner. As an example, an opening portion 50 is provided at two positions, as illustrated in FIGS. 3 to 5. During operation of the pressure vessel 10, the pressure vessel 10 is operated with the closing members 52 mounted in the respective opening portions 50 and thereby closing the opening portions 50. In this way, mixing of the first fluid and the second fluid can be prevented. During maintenance of the pressure vessel 10, the closing members 52 are demounted from the opening portions 50 to enable inspection of the second flow channels 40, replacement of the in-channel components 46, such as catalyst members, and so on.

The closing members 52 are formed to be insertable into the opening portions 50. To prevent leakage of the second fluid, the closing members 52 may be formed in a shape corresponding to the shape of the opening portions 50. In the case where the opening portions 50 are formed in a rectangular shape, the closing members 52 may be formed in a rectangular shape.

The closing members 52 can be made of a metallic material such as stainless steel or a Ni alloy or a ceramic such as alumina, for example. The closing members 52 may be made of a material having corrosion resistance to the second fluid. Also, closing members 52 may be made of the same material as the pressure vessel body 12. For example, in the case where the pressure vessel body 12 is made of a Ni alloy, the closing members 52 may be made of the Ni alloy of the same materials. In this way, the thermal expansion of the closing members 52 and the thermal expansion of the pressure vessel body 12 are substantially equal, which improves the sealing performance of the closing members 52 and also prevents cracking and the like of the closing members 52. Further, the closing members 52 may be made of a material that exhibits greater thermal expansion than the material of the pressure vessel body 12. By making the closing members 52 from a material that exhibits greater thermal expansion than the material of the pressure vessel body 12, the sealing performance of the closing members 52 can be enhanced by the difference in thermal expansion during operation of the pressure vessel 10.

While the closing members 52 may simply be inserted and fitted in the opening portions 50, the closing members 52 may also be fixedly mounted in the opening portions 50 in a demountable manner. For example, the closing members 52 may be fixedly mounted in the opening portions 50 with an adhesive 54 or the like. With the closing members 52 fixedly mounted in the opening portions 50 in a demountable manner, the closing members 52 are less likely to fall from the opening portions 50, so that leakage of the second fluid is prevented. As the adhesive 54, an inorganic adhesive may be used for it has heat resistance and corrosion resistance. As the inorganic adhesive, a ceramic adhesive such as an alumina adhesive, or the like may be used. As the inorganic adhesive, a commonly commercially available product can be used. Note that the gap between each closing member 52 and its opening portion 50 may be sealed with the inorganic adhesive or the like. This prevents leakage of the second fluid. Alternatively, the closing members 52 may be fixedly mounted in the opening portions 50 in a demountable manner by brazing, welding, or the like.

The closing members 52 may be mounted in the opening portions 50 so as not to project from the one longitudinal end surface of the pressure vessel body 12 or mounted in the opening portions 50 so as to project from the one longitudinal end surface of the pressure vessel body 12. In the case where the closing members 52 are mounted so as to project from the one longitudinal end surface of the pressure vessel body 12, the closing members 52 are easy to grip and therefore the closing members 52 can be easily demounted from the opening portions 50.

Each opening portion 50 may have a positioning member (not illustrated) for positioning its closing member 52. The positioning member may be formed as, for example, a protrusion or the like on the opening portion 50. As the closing member 52 is inserted into the opening portion 50 to be mounted, the closing member 52 is locked on the positioning member on the opening portion 50. Thus, the closing member 52 can be positioned. Although the shape of the positioning member is not particularly limited, it may be rectangular or the like.

The positioning member can be made of a metallic material such as stainless steel or a Ni alloy or a ceramic such as alumina, for example. The positioning member may be made of a material having corrosion resistance to the second fluid. The positioning member may be fixedly mounted to the opening portion 50 with an inorganic adhesive or the like. The positioning member may be formed integrally with the pressure vessel body 12. It suffices that at least one positioning member be provided to the opening portion 50, but a plurality of positioning members may be provided.

Next, the operation of the pressure vessel 10 will be described. During operation of the pressure vessel 10, the pressure vessel 10 is operated with the closing members 52 mounted in the opening portions 50 to close the opening portions 50 with the closing members 52, as illustrated in FIGS. 4 and 5. This prevents leakage of the second fluid from the opening portions 50 and thereby prevents mixing of the first fluid and the second fluid.

Figure 6:
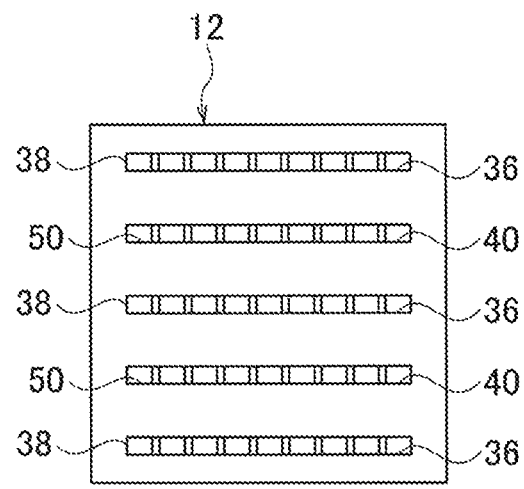
FIG. 6 is a schematic front view illustrating the one longitudinal end surface side of the pressure vessel body during maintenance of the pressure vessel in the embodiment of the present disclosure.
Figure 7:
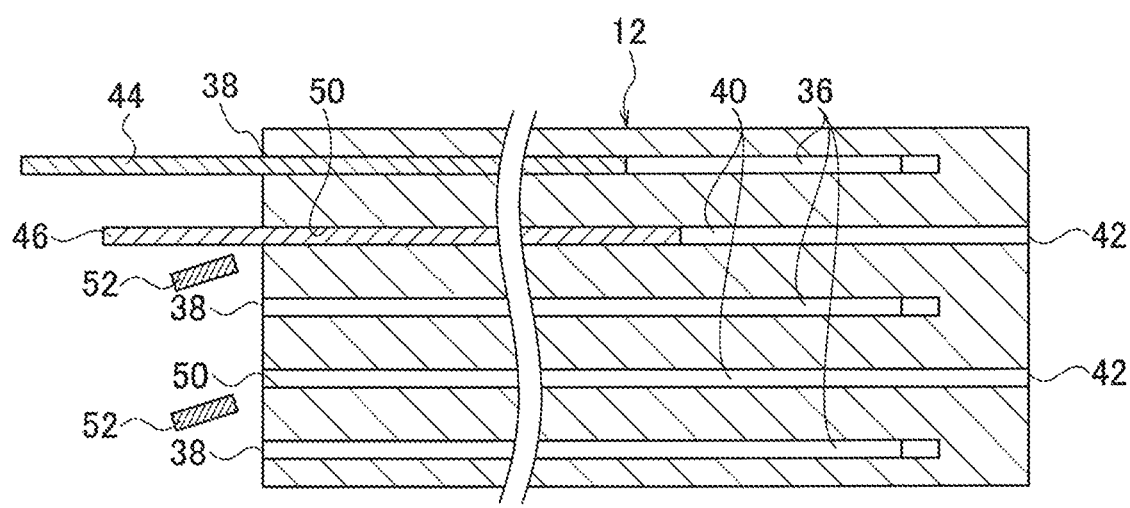
FIG. 7 is a schematic cross-sectional view illustrating a longitudinal cross section of the pressure vessel body during maintenance of the pressure vessel in the embodiment of the present disclosure.

During maintenance of the pressure vessel 10, the lid member 14 is opened and the closing members 52 are demounted from the opening portions 50. FIG. 6 is a schematic front view illustrating the one longitudinal end surface side of the pressure vessel body 12 during maintenance of the pressure vessel 10 FIG. 7 is a schematic cross-sectional view illustrating a longitudinal cross section of the pressure vessel body 12 during maintenance of the pressure vessel 10. The inorganic adhesive or the like with which the closing members 52 are fixedly mounted in their respective opening portions 50 in a demountable manner is removed, and the closing members 52 are demounted from the opening portions 50. With the closing members 52 demounted from the opening portions 50, the second flow channels 40 can be inspected from the opening portions 50. Also, in the case where the in-channel components 46, such as catalyst members, are provided in the second flow channels 40, it is possible to take out these in-channel components 46 through the opening portions 50 and replace them or perform other similar operations. Even in the case where the in-channel components 46 are not provided in the second flow channels 40, it is possible to perform inspection, maintenance, cleaning, and so on of the second flow channels 40 from the opening portions 50. Note that, as for the first flow channels 36, inspection, replacement of the in-channel components 44, and so on can be performed from the first-fluid inlet-outlet ports 38.

The above configuration includes a pressure vessel body having a rectangular cross-sectional shape and formed to extend in the direction of flow of fluids. The pressure vessel body includes a first flow channel which is formed in the longitudinal direction of the pressure vessel body and through which a first fluid is caused to flow, a second flow channel which is formed in the longitudinal direction of the pressure vessel body and through which a second fluid is caused to flow, a first-fluid inlet-outlet port which is provided in one longitudinal end surface of the pressure vessel body and connects with the first flow channel and through which the first fluid is caused to flow in or out, a second-fluid inlet-outlet port which is provided in the other longitudinal end surface of the pressure vessel body and connects with the second flow channel and through which the second fluid is caused to flow in or out, an opening portion which is provided in the one longitudinal end surface of the pressure vessel body and connects with the second flow channel, and a closing member which closes the opening portion in a demountable manner. Thus, it suffices that the one longitudinal end surface side of the pressure vessel body be configured to be openable and closable. More specifically, for example, it suffices that one lid member provided on the one longitudinal end surface side of the pressure vessel body be configured to be openable and closable, and the other lid member, provided on the other longitudinal end surface side of the pressure vessel body, does not need to be configured to be openable and closable. In this way, it is possible to eliminate the number of components for an opening and closing structure such as a flange that would otherwise be provided to the other lid member. Accordingly, the manufacturing cost of the pressure vessel can be lower. Also, since the number of components of the pressure vessel can be reduced, the pressure vessel can be lighter.

The present disclosure can make a pressure vessel lighter and make the manufacturing cost of a pressure vessel lower and is therefore useful for reactors, heat exchangers, and the like.

What is claimed is:

1. A pressure vessel comprising
    a pressure vessel body having a rectangular cross-sectional shape and formed to extend in a longitudinal direction,
    wherein the pressure vessel body includes
        a first flow channel which is formed in the longitudinal direction of the pressure vessel body and through which a first fluid is capable of flowing,
        a second flow channel which is formed in the longitudinal direction of the pressure vessel body and through which a second fluid is capable of flowing,
        a first-fluid inlet-outlet port which is provided in one longitudinal end surface of the pressure vessel body and connects with the first flow channel and through which the first fluid is capable of flowing in or out,
        a second-fluid inlet-outlet port which is provided in another longitudinal end surface of the pressure vessel body and connects with the second flow channel and through which the second fluid is capable of flowing in or out,
        an opening portion which is formed by opening a portion of one end surface which is the same as the one longitudinal end surface of the pressure vessel body provided with the first-fluid inlet-outlet port and connects with the second flow channel,
        a closing member which is inserted and fitted into the opening portion and made of stainless steel, a Ni alloy, or a ceramic to close the opening portion in a demountable manner,
        a first lid member which is provided at the one longitudinal end surface of the pressure vessel body provided with the first-fluid inlet-outlet port and the opening portion, and has an opening and closing structure, and
        a second lid member which is provided at the another longitudinal end surface of the pressure vessel body provided with the second-fluid inlet-outlet port, and has no opening and closing structure.

2. The pressure vessel according to claim 1, wherein
    the opening portion includes a positioning member which positions the closing member and is made of stainless steel, a Ni alloy, or a ceramic, and
    the positioning member is formed as a protrusion on the opening portion and formed integrally with the pressure vessel body.

3. The pressure vessel according to claim 1, wherein the closing member is fixedly mounted in a demountable manner.

4. The pressure vessel according to claim 2, wherein the closing member is fixedly mounted in a demountable manner.

5. The pressure vessel according to claim 3, wherein
    the closing member is fixedly mounted in a demountable manner with an inorganic adhesive, and
    a gap between the closing member and the opening portion is sealed with the inorganic adhesive.

6. The pressure vessel according to claim 4, wherein
    the closing member is fixedly mounted in a demountable manner with an inorganic adhesive, and
    a gap between the closing member and the opening portion is sealed with the inorganic adhesive.

7. The pressure vessel according to claim 1, wherein the closing member is made of a same material as the pressure vessel body.

8. The pressure vessel according to claim 1, wherein the closing member is made of a material that exhibits greater thermal expansion than a material of the pressure vessel body.

9. The pressure vessel according to claim 1, wherein an in-channel component is provided in the second flow channel.

10. The pressure vessel according to claim 1, wherein
an in-channel component is provided in the second flow channel, and
the second flow channel is formed such that the in-channel component is insertable from the second-fluid inlet-outlet port to the opening portion.

11. The pressure vessel according to claim 1, wherein
the pressure vessel body is made of stainless steel or a Ni alloy, and
the closing member is made of stainless steel or a Ni alloy.

12. The pressure vessel according to claim 1, wherein
the pressure vessel body is made of stainless steel or a Ni alloy, and
the closing member is made of a ceramic.

* * * * *